UNITED STATES PATENT OFFICE 2,684,360

PROCESS FOR THE SIMULTANEOUS STABILIZATION AND BLEACHING OF CELLULOSE ACETATE BY THE USE OF SODIUM CHLORITE

John G. Davoud, Coventry, England, assignor to Courtaulds Limited, London, England, a British company No Drawing. Application June 18, 1951, Serial No. 232,237

Claims priority, application Great Britain August 3, 1950

2 Claims. (Cl. 260—230)

This invention relates to the production of cellulose esters.

In the production of secondary cellulose esters for example cellulose acetate, by the normal solution process it is usual to submit the precipitated and washed secondary cellulose ester to a stabilising treatment in order to improve as far as possible the heat stability of the ester. One known method of stabilising consists in heating the ester with dilute aqueous mineral acid.

The cellulose ester products so obtained are generally discoloured to such an extent as to prevent their use for the production of transparent or delicately coloured articles by the usual moulding techniques and hence it has been proposed to bleach the cellulose ester either before or after its precipitation. French specification No. 915,740 describes a process of bleaching cellulose acetate during its manufacture by treating the solution of the secondary cellulose acetate with sodium chlorite. Examples of a bleaching treatment after precipitation are to be found in United States patent specification No. 1,948,517 which describes treating the precipitated cellulose derivative with a solution capable of liberating chlorine at temperatures above 50° centigrade and also in United States patent specification No. 2,135,980 which describes treating the cellulose derivative in solid form with a liquid essentially consisting of aqueous hydrogen peroxide of 0.2 to 5 per cent concentration to render the derivative free from colour and then drying the bleached derivative without washing.

The object of the present invention is to produce cellulose esters of improved heat-stability suitable for producing crystal clear mouldings.

According to the present invention, a process for the production of cellulose esters of improved heat stability comprises stabilising a precipitated secondary cellulose ester by treatment with a dilute aqueous solution of a mineral acid at a temperature not less than 70° centigrade, and preferably under pressure, and either simultaneously with or subsequent to the stabilising treatment, bleaching the cellulose ester by treatment at a temperature not less than 70° centigrade with an aqueous sodium chlorite solution in the presence of acid.

The preferred mineral acid for effecting the stabilisation is sulphuric acid. Aqueous solutions containing from 0.02 to 0.10 per cent by weight of sulphuric acid are particularly suitable.

The preferred concentration of sodium chlorite in the bleaching operation is from 0.1 to 2.5 per cent by weight, based on the weight of the cellulose ester. The stabilising and bleaching treatments may be conveniently carried out using slurries of the cellulose ester containing 10 parts by weight of liquid to 1 part by weight of solid.

When the stabilising and bleaching treatments are effected simultaneously the mineral acid added for the stabilising treatment serves also to provide the acid medium for the sodium chlorite. In this single stage process the temperature is preferably maintained within the range of 125° to 150° centigrade, the treatment then being effected under pressure. When the stabilising and bleaching treatments are effected separately, the stabilising is preferably effected under pressure at 125° to 150° centigrade as in the single stage process and the stabilising is then preferably effected at atmospheric pressure at a temperature in the range from 70° to 100° centigrade. The separate stabilising and bleaching treatments are conveniently effected in the same vessel, for example a pressure vessel.

The cellulose esters may be prepared from cotton linters or wood pulp.

Our investigations have shown that although a bleaching treatment of the cellulose ester before precipitation serves to remove the discoloured material then present, the subsequent stabilising treatment itself produces further discoloured products. We have now found that the step of bleaching the cellulose esters with sodium chlorite under acid conditions either at the same time as, or after, the stabilising treatment effectively bleaches the discoloured compounds which are present in the ester before precipitation and also those which are produced during the stabilisation so that the cellulose ester products, on moulding, give crystal clear articles of improved heat stability.

The invention is illustrated by the following examples in which parts and percentages are by weight.

*Example 1*

400 parts of freshly precipitated cellulose acetate flake were washed with water until the acetic acid content of the wash water was reduced to approximately 0.02 per cent. The flake, suspended in 10 times its weight of the 0.02 per cent acetic acid wash liquor, was then pumped into a pressure vessel fitted with a stirrer and the temperature of the liquor was raised to 90° centigrade with live steam. 1 part of sulphuric acid (1.98 specific gravity) and 2 parts of solid sodium chlorite were then added and the vessel was closed. The slurry was rapidly heated to approximately 140° centigrade and kept at this temperature for ½ hour, the slurry being stirred throughout. The pressure was then released and the flake was washed with water, and then dried.

The product, when injection-moulded, gave crystal clear mouldings of excellent heat-stability.

*Example 2*

A cellulose acetate slurry was prepared in a pressure vessel as described in Example 1 but instead of adding sulphuric acid and sodium chlorite, 1 part of sulphuric acid only was added. The slurry was then heated for ½ hour at 140° centigrade as described in Example 1 and the pressure was released. 2 parts of sodium chlorite were added to the hot slurry which was then stirred for ½ hour at 90-95° centigrade. The flake was washed with water and then dried.

The product, when injection-moulded, gave crystal clear mouldings of excellent heat-stability.

What I claim is:

1. In a process for the production of secondary cellulose acetate for moulding powders, the method of improving the heat stability of the cellulose acetate which comprises stabilizing and simultaneously bleaching a precipitated secondary cellulose acetate flake by treating it in the solid state at a temperature not less than 70° C. with an aqueous solution containing sodium chlorite and from 0.02 to 0.10 per cent by weight of sulphuric acid, the concentration of sodium chlorite being from 0.1 to 2.5 per cent by weight based on the weight of the cellulose acetate, then washing the thus-treated cellulose acetate until it is free from sulphuric acid and sodium chlorite and then drying the cellulose acetate, whereby a product capable of being moulded to give crystal-clear articles is obtained.

2. In a process for the production of secondary cellulose acetate for moulding powders, the method of improving the heat stability of the cellulose acetate which comprises stabilizing and simultaneously bleaching a precipitated secondary cellulose acetate flake by treating it in the solid state under pressure and at a temperature of from 125° C. to 150° C. with an aqueous solution containing sodium chlorite and from 0.02 to 0.10 per cent by weight of sulphuric acid, the concentration of sodium chlorite being from 0.1 to 2.5 per cent by weight based on the weight of the cellulose acetate, then washing the thus-treated cellulose acetate until it is free from sulphuric acid and sodium chlorite and then drying the cellulose acetate, whereby a product capable of being moulded to give crystal-clear articles is obtained.

References Cited in the file of this patent

UNITED STATES PATENTS

| Number | Name | Date |
| --- | --- | --- |
| 2,028,763 | Dreyfus | Jan. 28, 1936 |
| 2,109,509 | Schneider | Mar. 1, 1938 |
| 2,109,753 | Schneider | Mar. 1, 1938 |
| 2,194,956 | Taylor | Mar. 26, 1940 |
| 2,358,866 | MacMahon | Sept. 26, 1944 |
| 2,430,674 | Hampel | Nov. 11, 1947 |
| 2,470,192 | Seymour et al. | May 17, 1949 |

FOREIGN PATENTS

| Number | Country | Date |
| --- | --- | --- |
| 552,711 | Great Britain | Apr. 21, 1943 |
| 915,740 | France | July 29, 1946 |

OTHER REFERENCES

Taylor et al.: "Technical Ass'n Papers," 1940, pp. 251-254.